United States Patent
Okabe et al.

(10) Patent No.: US 8,304,873 B2
(45) Date of Patent: Nov. 6, 2012

(54) MANUFACTURING METHOD FOR DISPLAY DEVICE AND DISPLAY DEVICE

(75) Inventors: Tohru Okabe, Osaka (JP); Yoshimasa Chikama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 523 days.

(21) Appl. No.: 12/526,288

(22) PCT Filed: Jan. 11, 2008

(86) PCT No.: PCT/JP2008/050227
§ 371 (c)(1),
(2), (4) Date: Aug. 7, 2009

(87) PCT Pub. No.: WO2008/139745
PCT Pub. Date: Nov. 20, 2008

(65) Prior Publication Data
US 2010/0316870 A1    Dec. 16, 2010

(30) Foreign Application Priority Data

May 15, 2007   (JP) ................................ 2007-129054

(51) Int. Cl.
*H01L 23/06* (2006.01)
(52) U.S. Cl. ........ 257/684; 257/685; 257/725; 257/741; 257/761; 257/762; 257/763; 257/769; 257/774
(58) Field of Classification Search .................. None
See application file for complete search history.

(56) References Cited

U.S. PATENT DOCUMENTS

| | | | |
|---|---|---|---|
| 6,232,142 B1 * | 5/2001 | Yasukawa | 438/69 |
| 6,521,511 B1 * | 2/2003 | Inoue et al. | 438/458 |
| 6,709,901 B1 * | 3/2004 | Yamazaki et al. | 438/149 |
| 6,831,727 B2 * | 12/2004 | Akiyama et al. | 349/158 |
| 2001/0028077 A1 | 10/2001 | Nakamura et al. | |
| 2003/0062543 A1 | 4/2003 | Nakamura et al. | |
| 2004/0232104 A1 | 11/2004 | Kinoshita et al. | |
| 2007/0090404 A1 | 4/2007 | Kinoshita et al. | |

FOREIGN PATENT DOCUMENTS

| | | |
|---|---|---|
| EP | 0 858 110 A1 | 8/1998 |
| EP | 1 351 308 A1 | 10/2003 |
| EP | 1 655 633 A2 | 5/2006 |
| EP | 1 744 365 A2 | 1/2007 |
| EP | 1 758 169 A2 | 2/2007 |

(Continued)

OTHER PUBLICATIONS

Official communication issued in counterpart International Application No. PCT/JP2008/050227, mailed Feb. 5, 2008.

*Primary Examiner* — Duy Deo
(74) *Attorney, Agent, or Firm* — Keating & Bennett, LLP

(57) ABSTRACT

A method for manufacturing a display device includes a first step of preparing a first substrate which has a first area to be etched and a second area located at a periphery of the first area and which has a display element on its surface, a second step of etching and removing the first area of the first substrate, a third step of forming a second substrate on a surface of the first substrate that is opposite to the surface on which the display element is located, and a fourth step of removing the second area of the first substrate.

8 Claims, 4 Drawing Sheets

FOREIGN PATENT DOCUMENTS

| | | |
|---|---|---|
| JP | 05-249423 A | 9/1993 |
| JP | 08-262419 A | 10/1996 |
| JP | 2000-231450 A | 8/2000 |
| JP | 2001-013898 A | 1/2001 |
| JP | 2003-280548 A | 10/2003 |
| JP | 2004-071246 A | 3/2004 |
| JP | 2005-019054 A | 1/2005 |

* cited by examiner

MANUFACTURING METHOD FOR DISPLAY DEVICE AND DISPLAY DEVICE

BACKGROUND OF THE INVENTION

1. Field of the Invention

The present invention relates to a method for manufacturing a display device and a display device.

2. Description of the Related Art

Display devices in which a display element or the like is provided on a thin flexible substrate such as a plastic substrate are currently receiving attention because they are considerably superior, in terms of lightweight and flexibility, to display devices which use a glass substrate or a silicon substrate. Techniques for providing a display element or the like on a flexible substrate include a direct method in which the display element or the like is directly provided on the flexible substrate. The techniques also include a transfer method in which the display element or the like is temporarily provided on a glass substrate, a silicon substrate, or the like and later transferred to a flexible substrate (Japanese Laid-Open Patent Application Publication No. 10-125929, for example).

However, according to the above-described conventional transfer method, the display device is very weak in strength, and once the glass substrate, silicon substrate, or the like is removed, it is difficult to carry the display device.

To prevent this, a two-step process is carried out in which a thick support substrate is temporarily bonded to the front side of a display device, and then, the support substrate is separated or etched; after that, a flexible substrate is formed on the back side of the display device, and then, the support substrate is again separated or etched.

This two-step process requires more support substrates and also requires attachment and detachment processes for the support substrates. Accordingly, it is not only that costs are increased, but also that yields and quality are reduced, because the front side of the display device on which fine patterns are formed is exposed to an adhesive and an etchant.

SUMMARY OF THE INVENTION

In view of the above, preferred embodiments of the present invention provide a display device manufacturing method which enables a display element to be easily formed on a substrate at a low cost without reducing its quality, and also provide a display device.

A method for manufacturing a display device according to a preferred embodiment of the present invention includes a first step of preparing a first substrate which has a first area to be etched and a second area located at a periphery of the first area and which has a display element on its surface, a second step of etching and removing the first area of the first substrate, a third step of forming a second substrate on a surface of the first substrate that is opposite to the surface on which the display element is located, and a fourth step of removing the second area of the first substrate.

Unlike conventional transfer methods, the above-described structure according to a preferred embodiment of the present invention does not require an extra support substrate to which a display element is temporarily bonded, nor does it require removal of the support substrate. Thus, the display element can be easily formed on a substrate at a low cost. Further, etchant or the like is prevented from flowing from an etching side to a substrate surface and reaching to the display element, because only the first area surrounded by the second area is etched. Thus, yield and quality reduction of the display device can be effectively prevented. Moreover, unlike conventional direct methods, the display element can be formed on the first substrate at a high temperature by using, as the first substrate, a glass substrate or a silicon substrate which exhibits high strength, and therefore, a high-performance display device can be manufactured.

According to various preferred embodiments of the present invention, it is possible to provide a display device manufacturing method according to which a display element can be easily formed on a substrate at a low cost, and also to provide a display device.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Example Preferred Embodiments

Preferred embodiments of the present invention are hereinafter described in detail using the drawings. However, the present invention is not limited to these preferred embodiments described below.

Preferred Embodiment 1

A TFT (thin film transistor) substrate is described in detail as an example of a display device according to Preferred Embodiment 1 of the present invention, by using drawings.

Method for Forming TFT Substrate 10

First Substrate Formation Process

Figure 1:
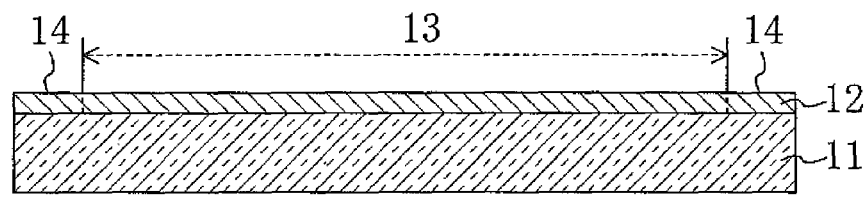
FIG. 1 is a cross-sectional view of a glass substrate for illustrating a first substrate formation process according to Preferred Embodiment 1 of the present invention.

First, a glass substrate 11 (first substrate) which, for example, has a substrate size of approximately 365×460 mm and a thickness of about 0.7 mm is prepared as shown in FIG. 1. Here, the first substrate may be made of any material, but a moisture impermeable material is particularly preferable.

Next, a high-performance TFT 12 is formed on the glass substrate 11 using a known technique.

Figure 2:
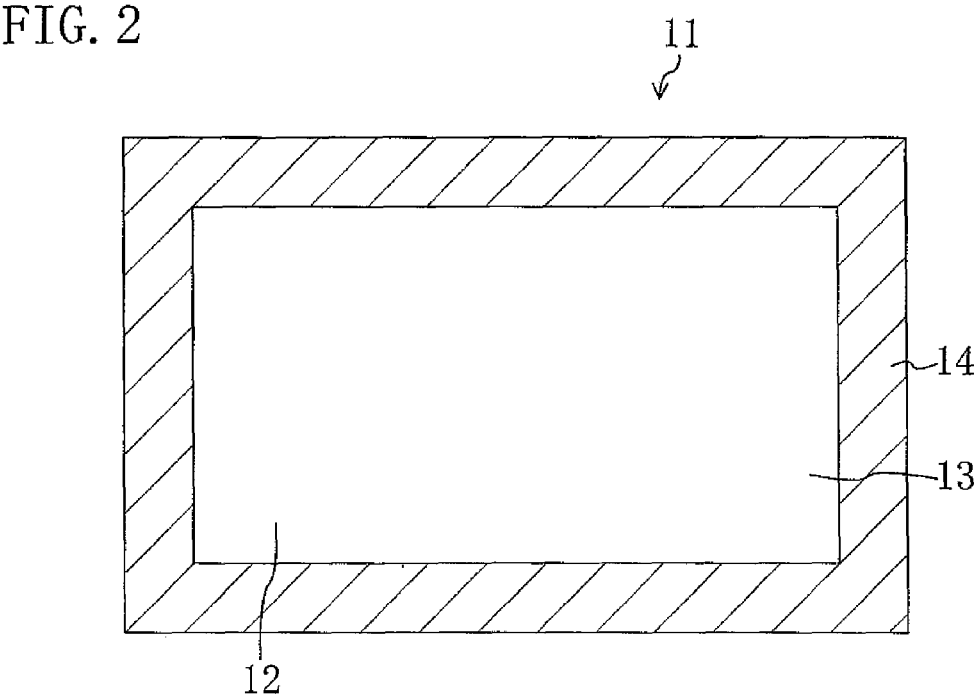
FIG. 2 is a plan view of a glass substrate on which a first area and a second area according to Preferred Embodiment 1 of the present invention are formed.

As shown in FIG. 2, an area where the TFT 12 is formed (first area 13) is surrounded by an area provided along the periphery of the substrate and having a width of approximately 50 mm, for example, where the TFT is not formed (second area 14). An alignment pattern, a test pattern or others used only when the TFT 12 is formed is provided in the second area 14.

Etch Protection Area Formation Process

Figure 3:
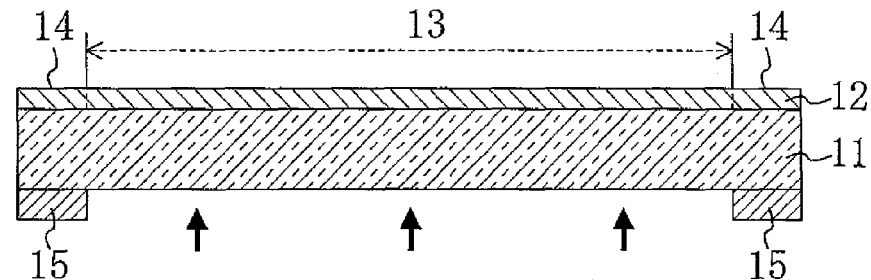
FIG. 3 is a cross-sectional view of a glass substrate for illustrating an etch protection area formation process and an etching process according to Preferred Embodiment 1 of the present invention.

Next, as shown in FIG. 3, an etching mask 15 (etch protection area) is formed, using a dry resist or the like, in the second area 14 of the surface of the glass substrate 11 that is opposite to the surface on which the TFT 12 is formed. At this time, only the first area 13 is exposed at the surface of the glass substrate 11 that is opposite to the surface on which the TFT 12 is formed.

Etching Process

Figure 4:
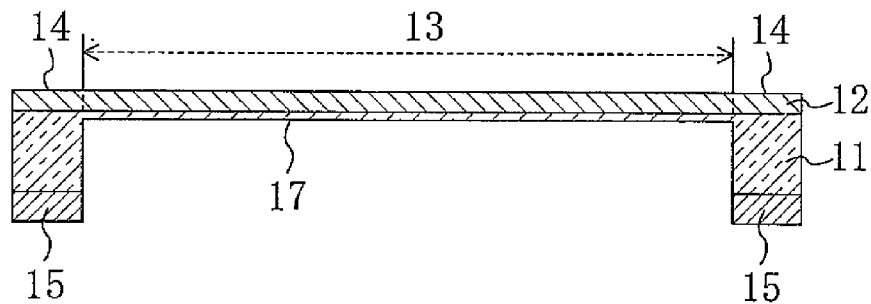
FIG. 4 is a cross-sectional view of a glass substrate which is etched by an etching process according to Preferred Embodiment 1 of the present invention.

Next, the surface of the glass substrate 11 that is opposite to the surface on which the TFT 12 is formed is etched using an etchant. Any kind of etchant can be used, but a hydrogen fluoride based etchant by which glass can be easily etched is particularly suitable. Arrows in FIG. 3 indicate the direction of etching. Wet etching is preferable for this etching because a physical etching method, such as polishing, may damage the TFT 12. Since only the first area 13 surrounded by the second area 14 provided with the etching mask 15 is etched, it is possible to prevent etching variations due to penetration of the etchant from the periphery of the glass substrate 11 which occurs when the entire surface of the glass substrate 11 is etched as in conventional transfer methods. Hence, the thickness of the glass substrate 11 can be effectively reduced to about 0.05 mm or less as shown in FIG. 4. Only wet etching is described here, but dry etching, such as plasma etching, may be used to increase the etching accuracy. The glass substrate 11 obtained by melting is known to exhibit very superior moisture barrier characteristics, and the display device can be used as a high-performance moisture barrier film by reducing this glass substrate 11 in thickness of about 0.01 mm or less, for example. Reducing the glass substrate to some extent without completely removing the glass substrate by etching is very effective particularly when a device such as an organic EL element which requires extremely high moisture barrier characteristics of about $10^{-6}$ g/m$^2$·day or more is formed on a highly permeable flexible substrate such as a plastic substrate.

The entire first area 13 of the glass substrate 11 can be etched if an etch stop layer is formed on the entire surface of the glass substrate 11 before the TFT 12 is formed. Moisture impermeable materials whose wet etch selectivity ratio to a glass substrate is high are preferable as a material for the etch stop layer. Transparent materials for the etch stop layer may preferably include an $Si_3N_4$ film and a $Ta_2O_5$ film formed by a thermal CVD method, for example. In the case of a self-luminous element such as an organic EL, the etch stop layer may be a stacked film of polycrystalline silicon and an insulating film, having a much higher wet etch selectivity ratio. The etch stop layer is a good-quality film, if formed on the glass substrate in a clean state and at a high temperature. Thus, the etch stop layer can be far superior to a moisture barrier film formed on a substrate which has low resistance to heat and which has asperities, such as a plastic substrate.

Etch Protection Area Removal Process

Figure 5:
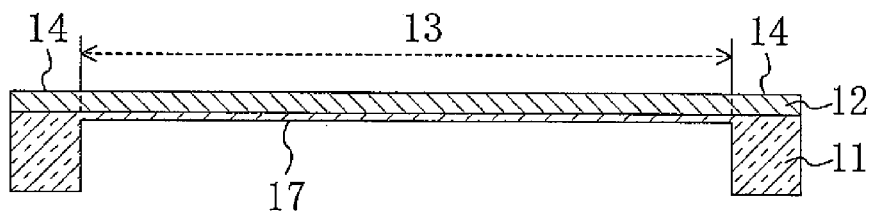
FIG. 5 is a cross-sectional view of a glass substrate having a depression after an etch protection area removal process according to Preferred Embodiment 1 of the present invention.

Next, as shown in FIG. 5, the etching mask 15 provided in the second area 14 is removed. The thickness of only the first area 13 is reduced by etching, and then, the etching mask 15 provided in the second area 14 is removed. As a result, a depression 17 is formed in the glass substrate 11.

Second Substrate Formation Process

Figure 6:
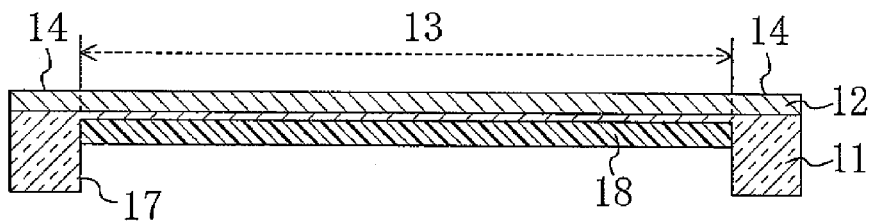
FIG. 6 is a cross-sectional view of a glass substrate having a depression in which a resin substrate is formed by a second substrate formation process according to Preferred Embodiment 1 of the present invention.

Next, as shown in FIG. 6, a resin material which, for example, has high viscosity is supplied into the depression 17 of the glass substrate 11, and after that, the resin material is baked to form a resin substrate 18 (second substrate).

Second Area Removal Process

Figure 7:
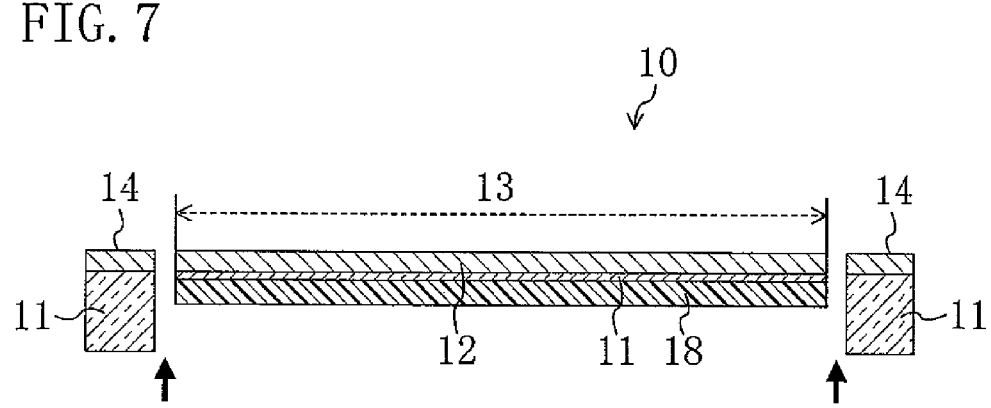
FIG. 7 is a cross-sectional view of a TFT substrate from which a second area is separated by a second area removal process according to Preferred Embodiment 1 of the present invention.

Next, as shown in FIG. 7, the second area 14 of the glass substrate 11 is separated from the first area 13 using laser light or the like, thereby forming a high-performance TFT substrate 10 on the thin, flexible substrate.

Structure of TFT Substrate 10

Now, a structure of the TFT substrate 10 formed by the above method is described.

The TFT substrate 10 includes the resin substrate 18 (second substrate) and the glass substrate 11 (first substrate) which is formed on the resin substrate 18 and which has the TFT 12.

The resin substrate 18 is made of a resin material having high viscosity, and the glass substrate 11 formed on the resin substrate 18 has a thickness of about 0.05 mm or less, for example. Thus, the TFT substrate 10 exhibits good flexibility. In addition, moisture can be effectively prevented from passing through the resin substrate 18 because the glass substrate 11 is interposed between the resin substrate 18 and the TFT 12.

Preferred Embodiment 2

Now, a liquid crystal display panel in which a TFT substrate and a CF (color filter) substrate (counter substrate) are laminated together is described in detail as an example of a display device according to Preferred Embodiment 2 of the present invention, by using drawings. Structural elements similar to those in Preferred Embodiment 1 are labeled with the same characters.

Method for Forming Liquid Crystal Display Panel 20

TFT Substrate Formation Process

Figure 8:
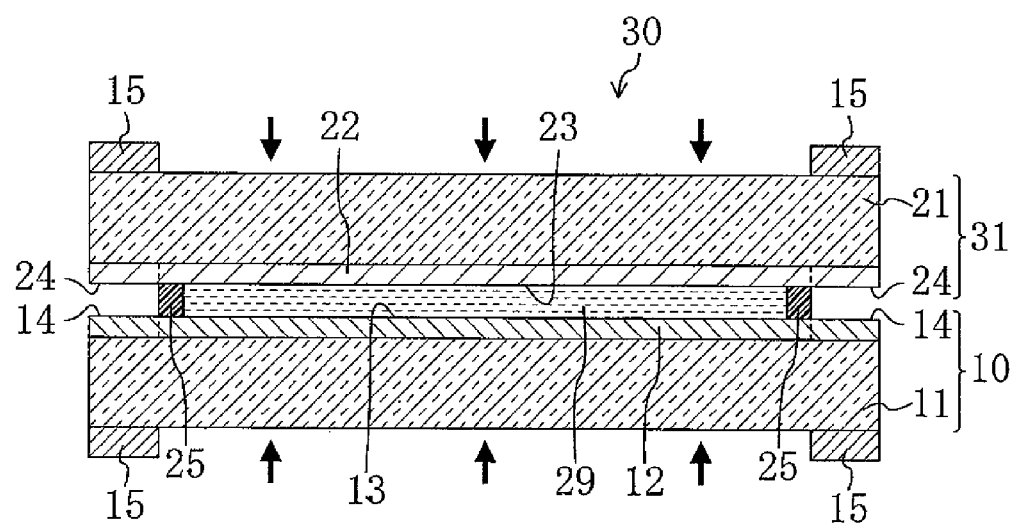
FIG. 8 is a cross-sectional view of glass substrates for illustrating an etch protection area formation process and an etching process for a laminated substrate according to Preferred Embodiment 2 of the present invention.
Figure 9:
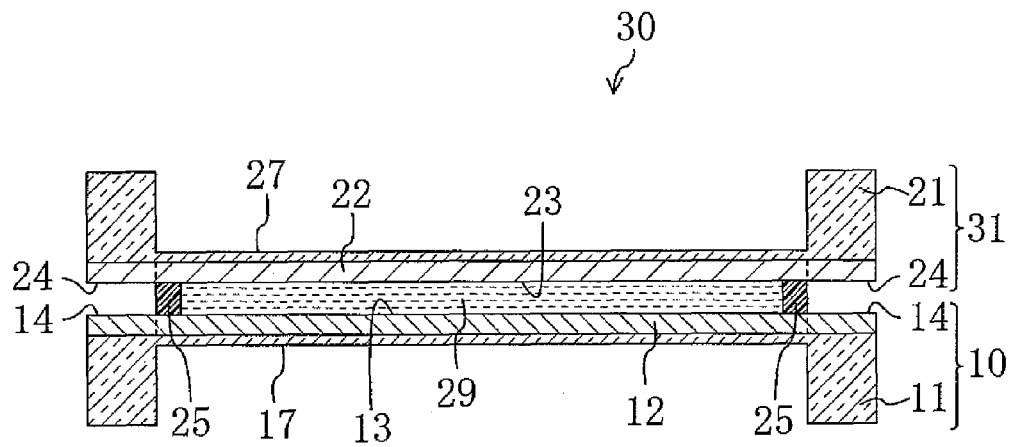
FIG. 9 is a cross-sectional view of a laminated substrate having a depression after an etch protection area removal process according to Preferred Embodiment 2 of the present invention.

A glass substrate 11 (first substrate) which, for example, has a substrate size of approximately 365×460 mm and a thickness of about 0.7 mm is prepared as shown in FIG. 8.

Next, a high-performance TFT 12 is formed on the glass substrate 11 using a known technique.

Here, an area where the TFT 12 is formed is surrounded by an area provided along the periphery of the substrate and having a width of approximately 50 mm where the TFT 12 is not formed, as shown in FIG. 2 of Preferred Embodiment 1. The area where the TFT 12 is formed is referred to as a first area 13, and the area where the TFT 12 is not formed is referred to as a second area 14.

CF Substrate Formation Process

Next, a glass substrate 21 (first substrate) which has a substrate size of approximately 365×460 mm and a thickness of about 0.7 mm is prepared by the same process as the above TFT substrate 10 formation process, and then, a counter substrate element 22, such as a color filter layer and a counter electrode, is formed on the surface of the glass substrate 21 to obtain a CF substrate 31.

Here, an area where the counter substrate element 22 is formed is surrounded by an area provided along the periphery of the substrate and having a width of approximately 50 mm where the counter substrate element 22 is not formed, as shown in FIG. 2 of Preferred Embodiment 1. The area where the counter substrate element 22 is formed is referred to as a first area 23, and the area where the counter substrate element 22 is not formed is referred to as a second area 24.

Substrate Laminating Process

Next, the TFT substrate 10 and the CF substrate 31 are laminated together using an epoxy-based resin 25 or the like such that the TFT 12 and the counter substrate element 22 face each other. A liquid crystal molecule is supplied into a space between the TFT 12 and the counter substrate element 22, thereby obtaining the laminated substrate 30.

Etch Protection Area Formation Process

Next, etching masks 15 (etch protection areas) are formed, using a dry resist or the like, in the respective second areas 14 and 24 of the surfaces of the glass substrates 11 and 21 that are opposite to the surfaces on which the TFT 12 and the counter substrate element 22 are formed. At this time, only the first areas 13 and 23 are exposed at respective surfaces of the glass substrates 11 and 21 that are opposite to the surfaces on which the TFT 12 and the counter substrate electrode 22 are formed.

Etching Process

Next, the surfaces of the glass substrates 11 and 21 that are opposite to the surfaces on which the TFT 12 and the counter substrate element 22 are formed are etched until the glass substrates 11 and 21 have a thickness of about 0.05 mm or less, for example, by using a hydrogen fluoride based etchant by which glass can be easily etched. Arrows in FIG. 8 indicate the direction of etching.

Etch Protection Area Removal Process

Next, the etching masks 15 provided in the second areas 14 and 24 are removed. The thicknesses of only the first areas 13 and 23 are reduced by etching, and then, the etching masks 15 provided in the second areas 14 and 24 are removed. As a result, depressions 17 and 27 are formed in the glass substrates 11 and 21, respectively.

Second Substrate Formation Process

Next, a resin material which, for example, has high viscosity is supplied into each of the depressions 17 and 27 of the glass substrates 11 and 21, and after that, the resin material is baked to form resin substrates 18 and 28 (second substrates).

Second Area Removal Process

Figure 10:
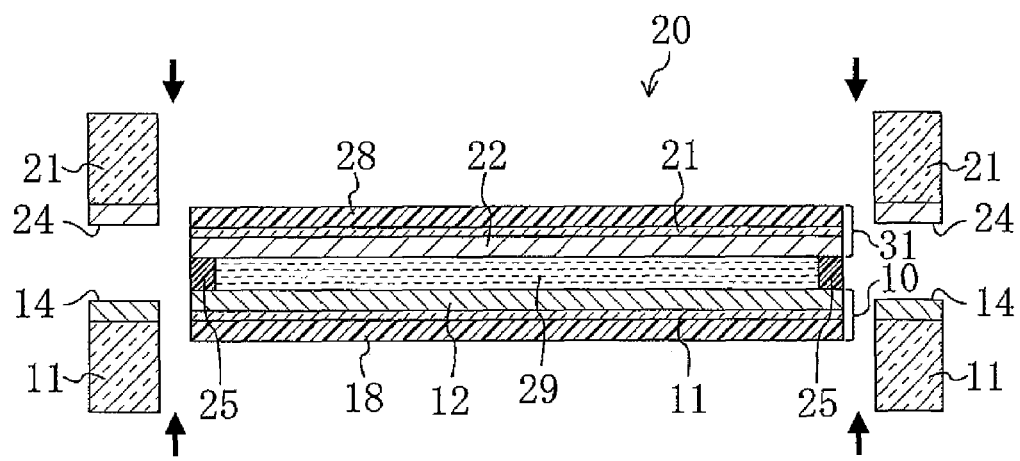
FIG. 10 is a cross-sectional view of a liquid crystal display panel from which a second area is separated by a second area removal process according to Preferred Embodiment 2 of the present invention.

Next, as shown in FIG. 10, the second areas 14 and 24 of the glass substrates 11 and 21 are separated from the first areas 13 and 23 using laser light or the like, and after that, a predetermined process, such as a polarizing plate formation process and a protection film formation process, is carried out, and as a result, a high-performance liquid crystal display panel 20 can be formed on the thin, flexible substrate.

Structure of Liquid Crystal Display Panel 20

Now, a structure of the liquid crystal display panel 20 formed by the above method is described.

The liquid crystal display panel 20 includes the laminated substrate 30 in which the TFT substrate 10 and the CF substrate 31 are laminated together, with the liquid crystal molecule 29 and a spacer (not shown) interposed therebetween, and includes a polarizing plate, a protection film and others (not shown) as shown in FIG. 10.

The TFT substrate 10 and the CF substrate 31 respectively includes the resin substrates 18 and 28 (second substrates) and the glass substrates 11 and 21 (first substrates) which are formed on the resin substrates 18 and 28 and which have the TFT 12 and the counter substrate element 22, respectively.

The resin substrates 18 and 28 are made of a resin material having high viscosity, and the glass substrates 11 and 21 formed on the resin substrates 18 and 28 have a thickness of about 0.01 mm or less, for example. Thus, the TFT substrate 10 and the CF substrate 31 exhibit good flexibility. In addition, moisture can be effectively prevented from passing through the resin substrates 18 and 28 because the glass substrates 11 and 21 are interposed between the resin substrate 18 and the TFT 12 and between the resin substrate 28 and the counter substrate element 22.

Elements formed in the first areas 13 and 23 are not limited to the above TFT 12 and the counter substrate element 22 such as CF, but may be a piezoelectric element and a wiring pattern.

In Preferred Embodiments 1 and 2, examples utilizing LCDs (liquid crystal displays) as display devices have been described. However, PDs (plasma displays), PALC (plasma addressed liquid crystal) displays, organic EL (organic electro luminescence) displays, inorganic EL (inorganic electro luminescence) displays, FEDs (field emission displays), SEDs (surface-conduction electron-emitter displays), etc. may be utilized as display devices.

Operations, Advantages and Effects

Operations, advantages and effects of preferred embodiments of the present invention are now described.

A method for forming the TFT substrate 10 includes a first step of preparing a glass substrate 11 which has a first area 13 to be etched and a second area 14 located at a periphery of the first area 13 and which has a TFT 12 on its surface, a second step of etching and removing the first area 13 of the glass substrate 11, a third step of forming a resin substrate 18 on a surface of the glass substrate 11 that is opposite to the surface on which the TFT 12 is located, and a fourth step of removing the second area 14 of the glass substrate 11. Unlike conventional transfer methods, the above structure does not require an extra support substrate to which the TFT 12 is temporarily bonded, nor does it require a removal of the support substrate. Thus, the TFT 12 can be easily formed on a substrate at a low cost. Further, etchant or the like is prevented from flowing from an etching side to a substrate surface and reaching to the TFT 12, because only the first area 13 surrounded by the second area 14 is etched. Thus, reduction in yield and quality of the TFT substrate 10 can be effectively prevented. Moreover, unlike conventional direct methods, the TFT 12 can be formed on the glass substrate 11 at a high temperature by using, as the glass substrate 11, a glass substrate or a silicon substrate which exhibits high strength, and therefore, a high-performance TFT substrate 10 can be manufactured.

According to the method for forming the TFT substrate 10, the thickness of the glass substrate 11 is reduced in the second step such that the glass substrate 11 is a thin film. According to this structure, the glass substrate 11 can be a support until the resin substrate 18 is formed in the third step, and at the same time a flexible display device can be obtained.

According to the method for forming the TFT substrate 10, the thickness of the glass substrate 11 is etched to be about 0.05 mm or less, for example. According to this structure, the TFT substrate 10 can exhibit good flexibility.

According to the method for forming the TFT substrate 10, an etch stop layer is formed between the glass substrate 11 and the TFT 12. According to this structure, the glass substrate 11 can be completely removed by etching, and thus, the thickness of the etch stop layer can be accurately controlled. Thus, the etch stop layer can be a support until the resin substrate 18 is formed in the third step, and at the same time a flexible display device can be obtained. Further, the etch stop layer can be formed on the glass substrate 11 which has high resistance to heat and a very flat surface, and therefore, a thin etch stop layer formed under good conditions can be used in the display device. In addition, the etch stop layer may be formed by a thermal CVD method. Thus, an $Si_3N_4$ film and a $Ta_2O_5$ film whose etch selectivity ratios to glass are very high can be formed in good conditions. At this time, the etch stop layer is transparent, and thus, there is no possibility that light is prevented from passing through. Moreover, the etch stop layer may be made of a polycrystalline silicon material. The etch selectivity ratio of this material to glass is very high, and thus, the thickness of the etch stop layer can be reduced.

According to the method for forming the TFT substrate 10, the second area 14 surrounds the first area 13, and a depression 17 is formed in the glass substrate 11 by etching and reducing the thickness of the first area 13 in the second step, and the resin substrate 18 is formed in the depression 17 in the third step. According to this structure, the display device can be formed efficiently and accurately only in an area where the display device needs to be formed.

The method for forming the TFT substrate 10 further includes the step of forming a laminated substrate 30 by laminating a CF substrate 31 which has a first area 13 to be etched and a second area 14 located at the periphery of the first area 13, to the glass substrate 11 prepared in the first step, with a liquid crystal molecule 29 interposed between the CF substrate 31 and the glass substrate 11, wherein the first area 13 of the glass substrate 11 and the first area 13 of the CF substrate 31 of the laminated substrate 30 are etched in the second step. According to this structure, a liquid crystal display element in which two substrates are laminated together can be easily formed at a low cost without reducing its quality.

The liquid crystal display panel 20 is formed by the above fabrication method and thus can be easily formed at a low cost without reducing the quality of the liquid crystal display panel 20.

The glass substrate 11 of the liquid crystal display panel 20 is made of a moisture impermeable material. This structure can prevent moisture from passing through the glass substrate 11 and reaching to the TFT 12. Thus, reduction in quality of the liquid crystal display panel 20 can be effectively prevented.

The etch stop layer of the liquid crystal display panel 20 is made of a moisture impermeable material. According to this structure, a quality etch stop layer, which is difficult to form directly on the resin substrate 18, can be formed on the resin substrate 18, and thus, moisture can be significantly prevented from passing through the etch stop layer and reaching to the TFT 12. Accordingly, reduction in quality of the liquid crystal display panel 20 can be effectively prevented.

As described in the above, the present invention relates to a method for manufacturing a display device and to a display device.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A method for manufacturing a display device comprising:
   a first step of preparing a first substrate which has a first area to be etched and a second area located at a periphery of the first area and which has a display element on its surface;
   a second step of etching and removing the first area of the first substrate;
   a third step of forming a second substrate on a surface of the first substrate that is opposite to the surface on which the display element is located; and
   a fourth step of removing the second area of the first substrate.

2. The method of claim 1, wherein in the second step, a thickness of the first substrate is reduced such that the first substrate is a thin film.

3. The method of claim 2, wherein in the second step, the thickness of the first substrate is etched to be about 0.05 mm or less.

4. The method of claim 1, wherein in the first step an etch stop layer is formed between the first substrate and the display element.

5. The method of claim 4, wherein the etch stop layer is formed by a thermal CVD method.

6. The method of claim 5, wherein the etch stop layer is made of a polycrystalline silicon material.

7. The method of claim 1, wherein
   the second area surrounds the first area;
   a depression is formed in the first substrate by etching and removing the first area in the second step; and
   the second substrate is formed in the depression in the third step.

8. The method of claim 1, further comprising a step of forming a laminated substrate by laminating a counter substrate which has a first area to be etched and a second area located at a periphery of the first area, to the first substrate prepared in the first step, with a display media interposed between the counter substrate and the first substrate, wherein the first area of the first substrate and the first area of the counter substrate of the laminated substrate are etched in the second step.

* * * * *